March 11, 1941.  O. S. HASKELL  2,234,730
BAKING OVEN
Filed April 5, 1939
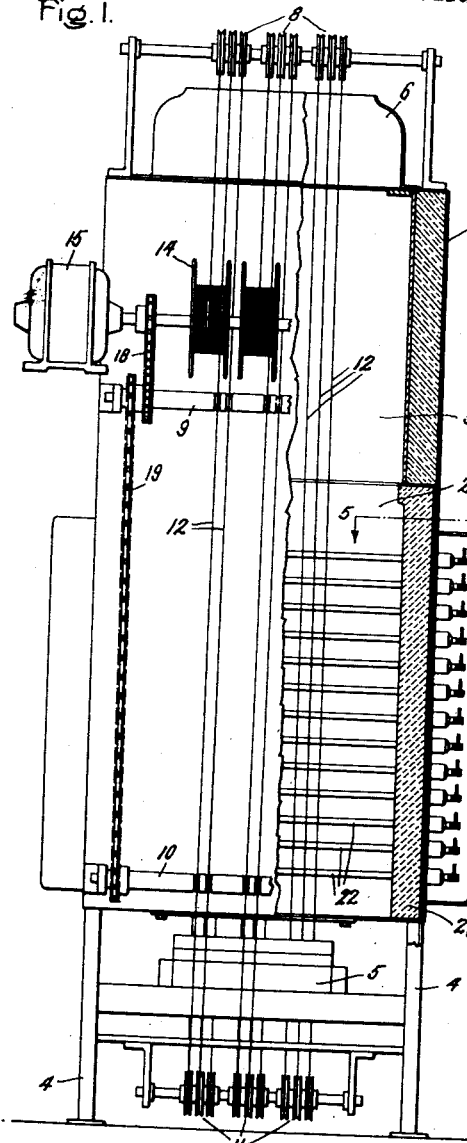
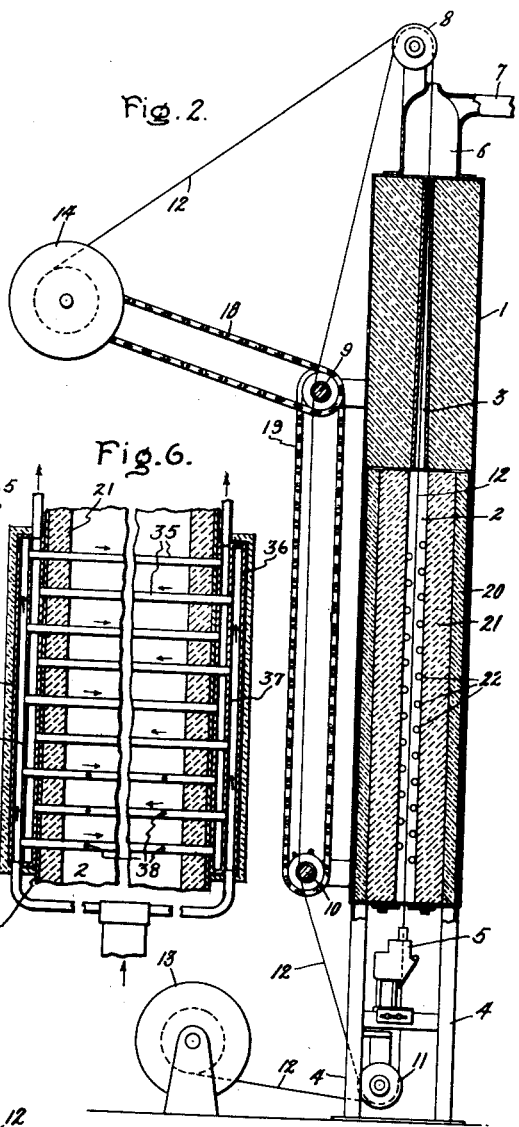
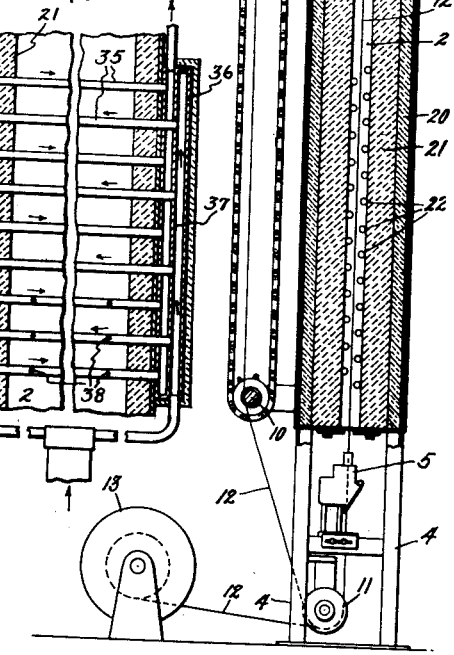
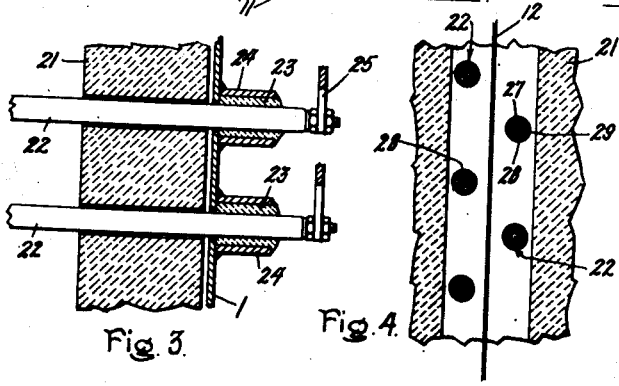
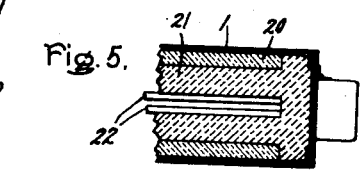
Inventor:
Orin S. Haskell,
by Harry E. Dunham
His Attorney.

Patented Mar. 11, 1941

2,234,730

UNITED STATES PATENT OFFICE 2,234,730

BAKING OVEN

Orin S. Haskell, Schenectady, N. Y., assignor to General Electric Company, a corporation of New York Application April 5, 1939, Serial No. 266,227

1 Claim. (Cl. 219—35)

My invention relates to baking ovens, and particularly to baking ovens of the type wherein the material to be heated is passed continuously therethrough. Although it has other applications, the oven comprising my invention is particularly useful for baking one or more coatings, such as varnish or enamel, on wire. My invention has for its object the provision of an improved oven having a construction which requires a minimum of space, has small heat loss and facilitates the inspection and replacement of the heating elements employed therein without otherwise disturbing the oven.

My invention will be better understood from the following description taken in connection with the accompanying drawing, and its scope will be pointed out in the appended claims.

Referring to the drawing, Fig. 1 is a side elevation of one embodiment of my invention; Fig. 2 is a vertical transverse section thereof; Figs. 3 and 4 show respectively detail views drawn to a larger scale of portions of Figs. 1 and 2; Fig. 5 is a cross sectional view taken on line 5—5 of Fig. 1; and Fig. 6 shows a modification.

As shown in the drawing, the oven comprises a steel enclosing casing 1 which includes the heating chamber 2 and superposed thereover the chamber 3 in which the coated wire is given a further heat treatment by which the coating thereon is completely hardened. The casing 1 is supported in an elevated position by the legs 4, and beneath it is arranged the apparatus 5 by which the coating is applied to the wire. On the top of the casing is the hood 6 which connects through the outlet duct 7 with a stack to carry off the fumes or, if preferred, it may connect with suitable apparatus for the recovery of the vapors driven off from the wire. The casing also supports the pulleys 8 at the top thereof and the pulleys 9 and 10 at the side thereof. Other pulleys 11 below the apparatus 5 are supported from the legs 4.

Wire 12 is withdrawn from one or more reels 13 over one or more pulleys 11 from which it passes up through the coating apparatus 5 and thence vertically through the chamber 2 where a baking and hardening of the coating occurs. It then passes on through the chamber 3 where by a continuation of the heat treatment the hardening process is completed. From the upper end of the chamber 3 the wire passes over one or more pulleys 8 to one or more reels 14 which are shown as driven by the motor 15. As thus described the wire makes a single traverse through the oven. If it is desired to give a wire a plurality of coats, whereby the wire must traverse the oven a plurality of times, the wire instead of passing to a reel 14 will pass over the small pulleys 9 and 10 to a pulley 11. Pulleys 9 and 10 preferably are driven as for example by the chains 18 and 19 from the motor 15 in order to reduce friction. In the drawing three separate wires are shown each receiving three coats and passing through the heating chamber in three strands.

That part of the casing 1 which encloses the heating chamber 2 is lined with the heat insulating material 20 and with the refractory material 21, the latter forming the walls of the heating chamber. The narrow heating chamber 2 is heated to the proper degree by heat radiators 16 which, as shown in Figs. 1, 3 and 4, comprise the straight transverse resistor rods 22 which, as better shown in Fig. 3, pass through the refractory material at the sides of the chamber and through suitable openings in the casing 1. Each rod is shown secured by cement 23 in the nipple 24 which is welded to the exterior of the casing. The several resistor rods are connected by the connectors 25 with a suitable source of current supply, not shown, preferably by individual switches whereby each resistor is separately controlled. An advantage of this manner of mounting the resistor rods is that any particular rod may be readily removed from the oven for inspection or replacement by simply removing the cement at either end and withdrawing the rod bodily from the oven. Thus any particular rod may be removed or renewed without in any way disturbing the other rods or without in any way interfering with the continuous operation of the oven.

As shown by Fig. 2, the resistor rods 22 are arranged adjacent to the opposite walls of the chamber 2, being preferably slightly spaced therefrom to allow better circulation of air and to avoid the formation of hot spots, and are staggered. By this arrangement the coated wire as it is drawn upward through the chamber is subjected to radiant heat from both sides, and the upward flow of heated air in the chamber is retarded, thereby conserving heat energy put into the furnace. The staggered arrangement of the resistor bars, moreover, produces a turbulence of the ascending column of air which brings the air into more intimate contact with the coated wire and thereby expedites the hardening of the coating. Hence a shorter chamber and fewer resistance bars are required.

Each resistor rod 22 comprises the central resistance conductor 27 enclosed by a metallic sheath 28 which preferably is grounded and insulated from the conductor by the layer of insulation 29. Resistance rods so constructed are of particular value in an oven of the above described character inasmuch as there is no danger of the wire touching the conductors and producing a short circuit in the oven in the event that it becomes broken. The insulating sheath and the conductor being made in a unit also has the advantage that the entire resistor may be inserted and removed in one operation and also the heating chamber can be made narrower than would be the case were the conductor to be provided with a separate sheath. Moreover, the rating of the oven may readily be changed by substituting higher or lower rated units.

The chamber 3 through which the wire in passing continues to be heated and the coating to become further hardened is made as narrow as practicable to limit the loss of heat and is also tapered from bottom to top to correspond with the vibration angle of the strands of wire extending therethrough whereby the loss of heat through the chambers is reduced to a minimum.

In the modified form of my invention illustrated by Fig. 6, the oven is heated by fuel such as gas or oil, and for that purpose the oven is provided with heat radiators comprising the straight fuel fired tubes 35. The tubes are arranged adjacent to the walls of the heating chamber, being removable longitudinally and staggered in the same manner as the resistors in Figs. 2 and 4. They may connect with the headers 36, preferably heat insulated, at opposite sides of the oven, each heater being shown divided by the central partition 37 into an intake and an exhaust portion. Preferably the connections are such that alternate tubes carry heat in the same direction, adjacent tubes carrying heat in opposite directions. Hot gas may, if desired, be supplied to the tubes by individual burners, but I prefer to employ the headers to which hot gas is supplied. The gas may, for example, be taken from a gas atmosphere producer such as that disclosed in my Patent 2,085,584 June 29, 1937, in which case the intake portions of the headers would be connected to receive the hot gas from the producer without passing to the cooler. If it is desired to have a gas atmosphere in the oven, the tubes may be provided with the holes 38 to allow some of the atmosphere to escape into the heating chamber.

I have chosen the particular embodiment described above as illustrative of my invention, and it will be apparent that various modifications may be made without departing from the spirit and scope of my invention which modification I aim to cover by the appended claim.

What I claim as new and desire to secure by Letters Patent of the United States, is:

A baking oven comprising a heat insulating structure open to the atmosphere at the top and bottom and forming a narrow heating chamber through which a column of heated air may ascend, means for moving a plurality of coated strands of wire vertically through said chamber and a plurality of transverse heat radiators adjacent the opposite side walls of said chamber and close to said strands, the radiators adjacent one wall being staggered with respect to those adjacent the other wall thereby increasing the turbulence of the heated air passing through the chamber and impeding the natural upward flow thereof.

ORIN S. HASKELL.